(12) United States Patent
Kornegay et al.

(10) Patent No.: US 7,840,759 B2
(45) Date of Patent: Nov. 23, 2010

(54) SHARED CACHE EVICTION

(75) Inventors: Marcus L. Kornegay, Durham, NC (US); Ngan Pham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 11/689,265

(22) Filed: Mar. 21, 2007

(65) Prior Publication Data

US 2008/0235456 A1 Sep. 25, 2008

(51) Int. Cl.
*G06F 12/00* (2006.01)
(52) U.S. Cl. .............. 711/133; 711/130; 711/135; 711/E12.038; 711/E12.039
(58) Field of Classification Search ........... 711/133
See application file for complete search history.

(56) References Cited

U.S. PATENT DOCUMENTS

| | | | |
|---|---|---|---|
| 6,704,845 B2 * | 3/2004 | Anderson et al. .......... | 711/146 |
| 6,950,909 B2 | 9/2005 | Guthrie et al. | |
| 6,965,970 B2 | 11/2005 | Mosur et al. | |
| 7,023,445 B1 | 4/2006 | Sell | |
| 7,120,752 B2 | 10/2006 | Wilson et al. | |
| 7,577,792 B2 * | 8/2009 | Hady et al. .................. | 711/130 |
| 2003/0126369 A1 | 7/2003 | Creta et al. | |
| 2004/0168030 A1 * | 8/2004 | Traversat et al. ............ | 711/133 |
| 2007/0005899 A1 * | 1/2007 | Sistla et al. .................. | 711/134 |

OTHER PUBLICATIONS

Kim Hazelwood, et al.; Exploring Code Cache Eviction Granularities in Dynamic Optimization Systems; Proceedings of the International Symposium on Code Generation and Optimization; 2004; IEEE Computer Society.

* cited by examiner

*Primary Examiner*—Shane M Thomas
*Assistant Examiner*—Hamdy S Ahmed
(74) *Attorney, Agent, or Firm*—H. Barrett Spraggins; Cynthia G. Seal; Biggers & Ohanian, LLP.

(57) ABSTRACT

Methods and systems for shared cache eviction in a multi-core processing environment having a cache shared by a plurality of processor cores are provided. Embodiments include receiving from a processor core a request to load a cache line in the shared cache; determining whether the shared cache is full; determining whether a cache line is stored in the shared cache that has been accessed by fewer than all the processor cores sharing the cache if the shared cache is full; and evicting a cache line that has been accessed by fewer than all the processor cores sharing the cache if a cache line is stored in the shared cache that has been accessed by fewer than all the processor cores sharing the cache.

19 Claims, 3 Drawing Sheets

Cache Reference Directory 'CRD' 118

Cache Line ID ~ 202
Address ~ 204
CPU Core 0 ~ 206
CPU Core 1 ~ 208
CPU Core 2 ~ 210

FIG. 2

SHARED CACHE EVICTION

BACKGROUND OF THE INVENTION

1. Field of the Invention

The field of the invention is data processing, or, more specifically, methods, apparatus, and products for shared cache eviction.

2. Description of Related Art

Multi-core computer architecture typically includes multiple processor cores on a single chip, referred to as a chip multiprocessor (CMP). The chip also typically includes cache memory shared by the multiple processors cores referred to as a shared cache. When the shared cache becomes full one or more cache lines in the shared cache is typically evicted. Conventional eviction schemes simply evict the least frequently used cache line or the least recently used cache line without regard to which processor cores or how many processor cores accessed the cache line. There is therefore an ongoing need for improvement in the field of shared cache eviction in multi-core processor computer architecture.

SUMMARY OF THE INVENTION

Methods and systems for shared cache eviction in a multi-core processing environment having a cache shared by a plurality of processor cores are provided. Embodiments include receiving from a processor core a request to load a cache line in the shared cache; determining whether the shared cache is full; determining whether a cache line is stored in the shared cache that has been accessed by fewer than all the processor cores sharing the cache if the shared cache is full; and evicting a cache line that has been accessed by fewer than all the processor cores sharing the cache if a cache line is stored in the shared cache that has been accessed by fewer than all the processor cores sharing the cache.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 sets forth a block diagram of a data structure useful as a cache reference directory.

DETAILED DESCRIPTION OF EXEMPLARY EMBODIMENTS

Figure 1:
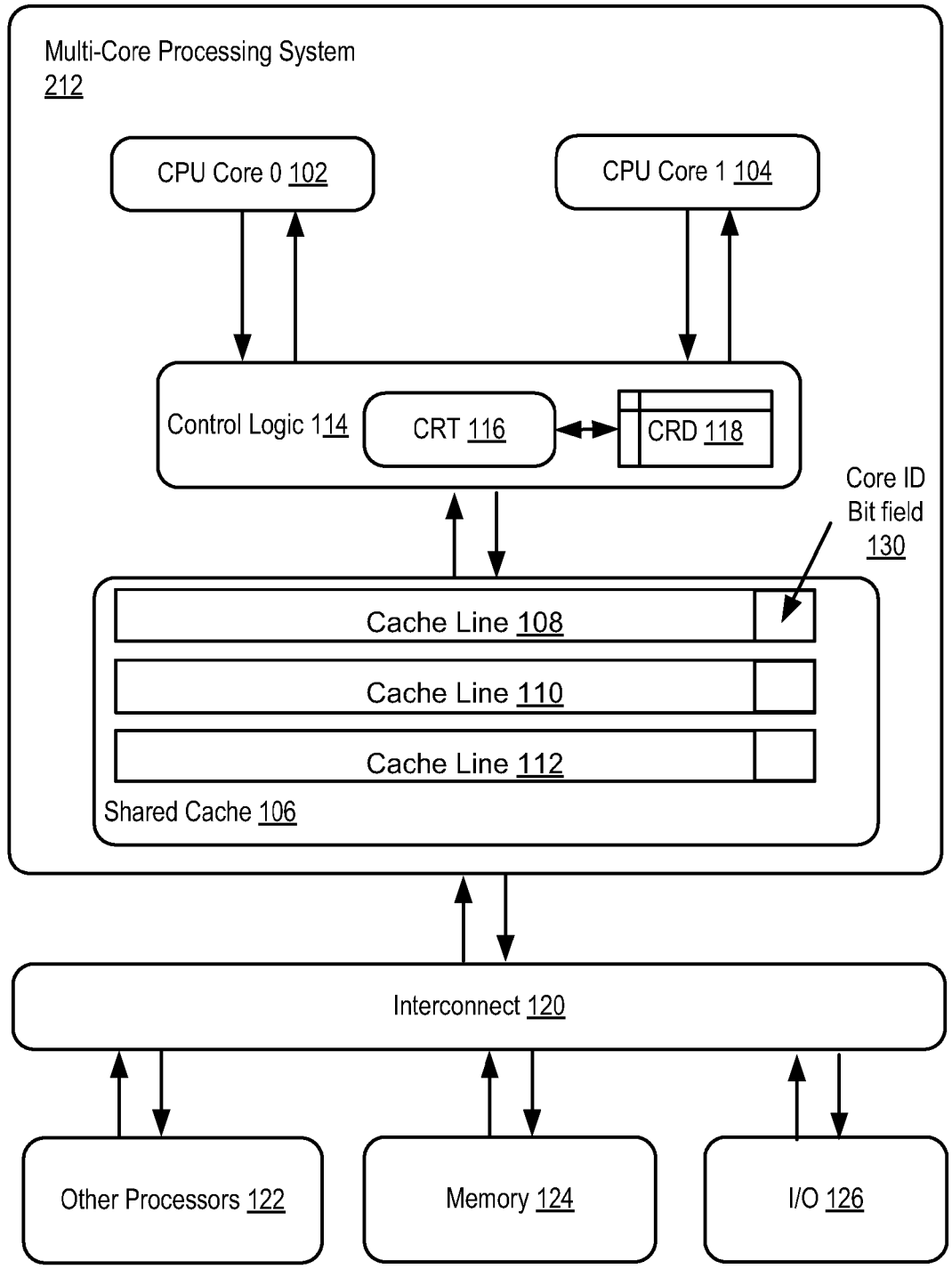
FIG. 1 sets forth a block diagram illustrating an exemplary system for shared cache eviction according to embodiments of the present invention.

Exemplary methods and systems products for shared cache eviction according to embodiments of the present invention are described with reference to the accompanying drawings, beginning with FIG. 1. FIG. 1 sets forth a block diagram illustrating an exemplary system for shared cache eviction according to embodiments of the present invention. The system of FIG. 1 operates generally to evict cache lines in a shared cache in a multi-core processing environment having a cache shared by a plurality of processor cores. The system of FIG. 1 operates for shared cache eviction by receiving from a processor core (102 or 104) a request to load a cache line in the shared cache (106); determining whether the shared cache (106) is full; determining whether a cache line (108, 110, or 112) is stored in the shared cache (106) that has been accessed by fewer than all the processor cores (102 and 104) sharing the cache (106) if the shared cache is full; and evicting a cache line (102) that has been accessed by fewer than all the processor cores (102 and 104) sharing the cache if a cache line (108, 110, or 112) is stored in the shared cache (106) that has been accessed by fewer than all the processor cores (102 and 104) sharing the cache.

Shared cache eviction according to embodiments of the present invention often includes evicting a cache line accessed by the fewest number of processor cores. That is, for example, in a two processor system, shared cache eviction supports evicting a cache line accessed by only one processor and in a three processor system, shared cache eviction supports prioritizing evicting a cache line accessed by only one processor rather than a cache line accessed by two processors and so on. Evicting a cache line accessed by the fewest number of processors maintains cache lines in the shared cache that have been accessed by more processor cores.

The exemplary system of FIG. 1 includes a multi-core processing system (212) having a cache (106) shared by a plurality of processor cores (102 and 104). The system of FIG. 1 includes control logic (114) coupled to the plurality of processor cores (102 and 104) and the shared cache (106). The control logic is capable of receiving requests to load cache lines (108, 110, and 112) into the shared cache (106) and providing access to the stored cache lines (108, 110 and 112) to the processor cores (102 and 104). The control logic (114) is also capable of evicting cache lines (108, 110, and 112) from the shared cache (106) if the shared cache is full.

The control logic (116) of FIG. 1 includes a cache reference tracker ('CRT') (116) capable of writing, to a core ID field in a cache reference directory ('CRD') in response to a processor core accessing a cache line in the shared cache, a core ID for the core processor accessing the cache line. The CRD (118) is implemented as a data structure useful in tracking cache lines that have been accessed by fewer than all the processor cores. Such a data structure allows a CRT (116) to quickly identify one or more cache lines accessed by the fewest processor cores and evict those cache lines thereby preserving in the cache lines that have been accessed by more processor cores.

The CRT (116) of FIG. 1 is also capable of writing, to a core ID bit field (130) in a cache line (108, 110, and 112) in response to a processor core accessing a cache line in the shared cache, a core ID for the core processor accessing the cache line. In such cases, the CRT can then determine which processor cores have accessed the cache line from the bit field (130) in the cache line itself.

The cache reference tracker (116) is also capable of determining whether a cache line is stored in the shared cache that has been accessed by fewer than all the processor cores sharing the cache if the shared cache is full. The cache reference tracker (116) is capable of determining whether a cache line is stored in the shared cache that has been accessed by fewer than all the processor cores sharing the cache by either scanning a cache reference directory ('CRD') (118) to identify one or more cache lines accessed by fewer than all the processor cores or by scanning a core ID bit field (130) in each of the cache lines (108, 110, and 112) stored in the shared cache (106).

The multi-core processing system (212) is coupled through an interconnect (120) to other processors (112), memory (124), and input/output devices (126). The arrangement of systems and components making up the exemplary system illustrated in FIG. 1 are for explanation, not for limitation. Data processing systems useful according to various embodiments of the present invention may include additional components, devices, servers, routers, other devices, and peer-to-peer architectures, not shown in FIG. 1, as will occur to those of skill in the art. Various embodiments of the present invention may be implemented on a variety of hardware platforms in addition to those illustrated in FIG. 1.

In the example of FIG. 1 there are shown only two processor cores (102 and 104) and three cache lines (108, 110, and 112) in the shared cache. This is for explanation and not for limitation. In fact, multi-core processing systems support many processing cores and many, many more cache lines in the shared cache and all such multi-core processing systems are well within the scope of the present invention.

As mentioned above, a cache reference tracker according to some embodiments of the present invention is capable of determining whether a cache line is stored in the shared cache that has been accessed by fewer than all the processor cores sharing the cache by scanning a cache reference directory ('CRD') (118) to identify one or more cache lines accessed by fewer than all the processor cores. The CRD (118) is typically implemented as a data structure useful in tracking cache lines that have been accessed by fewer that all the processor cores. For further explanation, therefore FIG. 2 sets forth a block diagram of a data structure useful as a CRD (118). The CRD (118) of FIG. 2 includes a cache line ID field (202) containing a unique identification of a cache line stored in the shared cache. The CRD (118) of FIG. 2 includes an address field (204) containing the address in the shared cache where the cache line identified in field (202) resides.

The CRD also include Boolean fields (206, 208, and 210) for each processor core having access to the shared cache. Each Boolean field contains a Boolean indicator identifying whether that particular processor core accessed the cache line identified in field (202). The CRD of FIG. 2 advantageously allows a CRT (116) to quickly identify one or more cache lines accessed by the fewest processor cores. Evicting those cache lines thereby preserves the cache lines that have been accessed by more processor cores.

Figure 3:
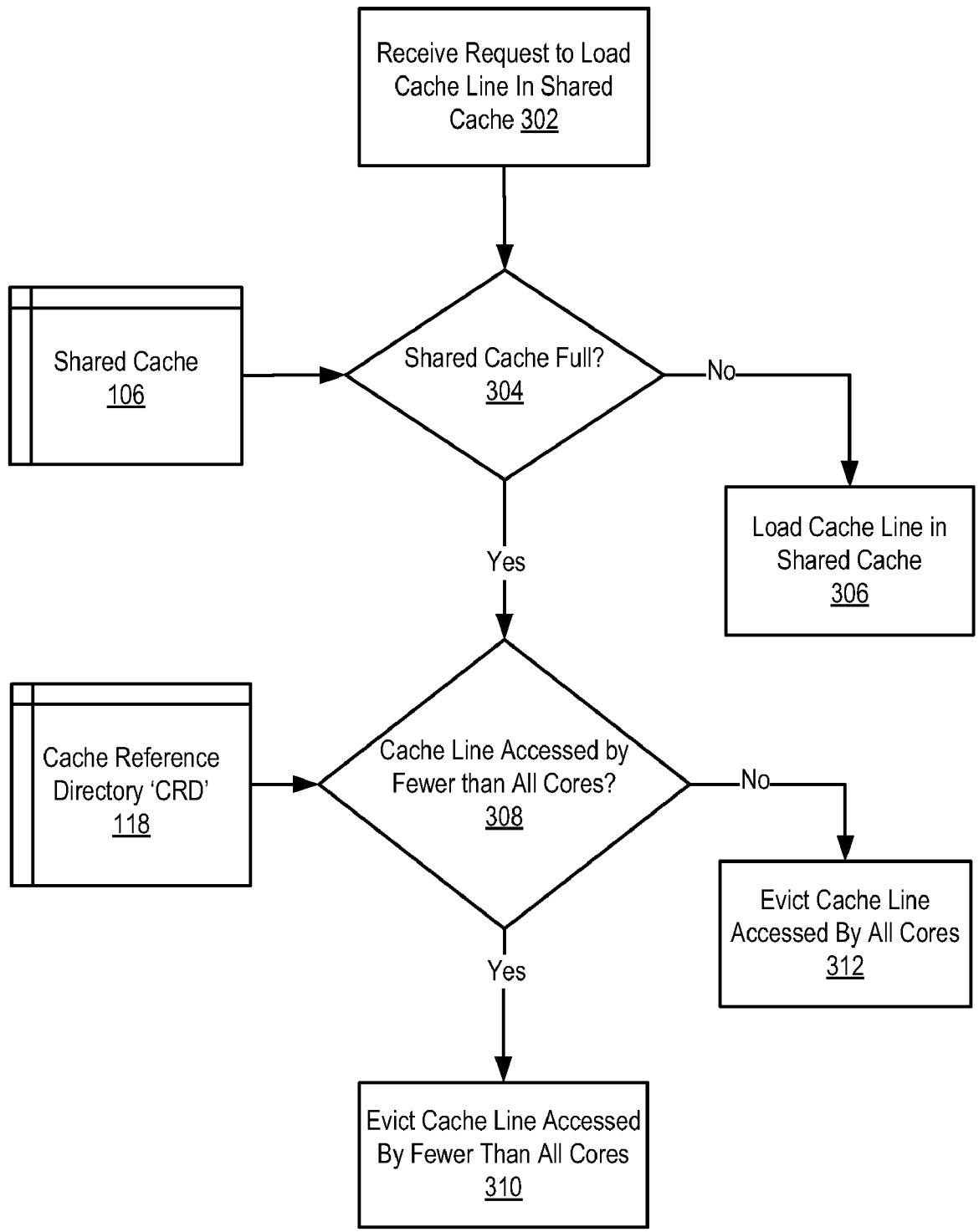
FIG. 3 sets forth a flow chart illustrating an exemplary method for shared cache eviction according to embodiments of the present invention.

For further explanation, FIG. 3 sets forth a flow chart illustrating an exemplary method for shared cache eviction according to embodiments of the present invention. The method of FIG. 3 is implemented in a multi-core processing environment having a cache shared by a plurality of processor cores. The method of FIG. 3 includes receiving (302) from a processor core a request to load a cache line in the shared cache (106) and determining (304) whether the shared cache (106) is full. If the shared cache is not full the method of FIG. 3 includes loading the cache line in the shared cache (306).

If the shared cache is full, the method of FIG. 3 includes determining (308) whether a cache line is stored in the shared cache (106) that has been accessed by fewer than all the processor cores sharing the cache. Determining (3080) whether a cache line is stored in the shared cache (106) that has been accessed by fewer than all the processor cores may be carried out by searching in a cache reference directory ('CRD') (118) for cache lines identified as having been accessed by fewer than all the processor cores. In such embodiments, each time a cache line in the shared cache is accessed a core ID for the core processor accessing the cache line is written to a core ID field in the cache reference directory. The CRD allows for quick identification of one or more cache lines accessed by the fewest processor cores. Evicting those cache lines thereby preserves the cache lines that have been accessed by more processor cores.

Alternatively, determining (308) whether a cache line is stored in the shared cache that has been accessed by fewer than all the processor cores sharing the cache may be carried out by reading a core ID bit field from a cache line (not shown) in the shared cache and determining in dependence upon the contents of the core ID bit field whether the cache line was accessed by fewer than all the processor cores sharing the cache. In such embodiments, each time a cache line in the shared cache is accessed a core ID for the core processor accessing the cache line is written to a core ID bit field in a cache line itself. In such cases, the determination of whether a cache line was accessed by fewer than all the core processors may be made from the cache lines themselves.

If a cache line is stored in the shared cache that has been accessed by fewer than all the processor cores sharing the cache, the method of FIG. 3 includes evicting (416) a cache line that has been accessed by fewer than all the processor cores sharing the cache. Evicting (416) a cache line that has been accessed by fewer than all the processor cores sharing the cache may often include evicting a cache line accessed by the fewest number of processor cores. Evicting those cache lines that have been accessed by the fewest number of processor cores thereby preserves the cache lines that have been accessed by more processor cores.

Evicting (416) a cache line that has been accessed by fewer than all the processor cores sharing the cache may be carried out by selecting a least recently used cache line that that has been accessed by fewer than all the processor cores and evicting the selected cache line. Evicting a cache line that has been accessed by fewer than all the processor cores sharing the cache if a cache line is stored in the shared cache that has been accessed by fewer than all the processor cores sharing the cache may also include selecting a least frequency used cache line that that has been accessed by fewer than all the processor cores and evicting the selected cache line.

If a cache line is stored in the shared cache that has been accessed by fewer than all the processor cores sharing the cache then the method of FIG. 3 includes evicting (312) a cache line accessed by all of the cores. Evicting a cache line accessed by all of the cores may include evicting a least recently used cache line accessed by the processor cores, evicting a least frequently used cache line that has been accessed by all the processor cores, or others as will occur to those of skill in the art.

Exemplary embodiments of the present invention are described largely in the context of a fully functional computer system for shared cache eviction. Readers of skill in the art will recognize, however, that aspects of the present invention also may be embodied in a computer program disposed on signal bearing media. Such signal bearing media may be transmission media or recordable media for machine-readable information, including magnetic media, optical media, or other suitable media. It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for shared cache eviction, the method implemented in a multi-core processing environment having a cache shared by a plurality of processor cores, the method comprising:

receiving from a processor core a request to load a cache line in the shared cache;

determining whether the shared cache is full;
determining whether a cache line is stored in the shared cache that has been accessed by fewer than all the processor cores sharing the cache if the shared cache is full; and
evicting a cache line that has been accessed by fewer than all the processor cores sharing the cache if a cache line is stored in the shared cache that has been accessed by fewer than all the processor cores sharing the cache.

2. The method of claim 1 wherein evicting a cache line that has been accessed by fewer than all the processor cores sharing the cache if a cache line is stored in the shared cache that has been accessed by fewer than all the processor cores sharing the cache further comprises evicting a cache line accessed by the fewest number of processor cores.

3. The method of claim 1 wherein evicting a cache line that has been accessed by fewer than all the processor cores sharing the cache if a cache line is stored in the shared cache that has been accessed by fewer than all the processor cores sharing the cache further comprises:
    selecting a least recently used cache line that that has been accessed by fewer than all the processor cores; and
    evicting the selected cache line.

4. The method of claim 1 wherein evicting a cache line that has been accessed by fewer than all the processor cores sharing the cache if a cache line is stored in the shared cache that has been accessed by fewer than all the processor cores sharing the cache further comprises:
    selecting a least frequency used cache line that that has been accessed by fewer than all the processor cores; and
    evicting the selected cache line.

5. The method of claim 1 wherein determining whether a cache line is stored in the shared cache that has been accessed by fewer than all the processor cores sharing the cache further comprises searching in a cache reference directory for cache lines identified as having been accessed by fewer than all the processor cores.

6. The method of claim 1 further comprising writing, to a core ID field in the cache reference directory in response to a processor core accessing a cache line in the shared cache, a core ID for the core processor accessing the cache line.

7. The method of claim 1 further comprising writing, to a core ID bit field in a cache line in response to a processor core accessing a cache line in the shared cache, a core ID for the core processor core accessing the cache line.

8. The method of claim 7 wherein determining whether a cache line is stored in the shared cache that has been accessed by fewer than all the processor cores sharing the cache further comprises reading a core ID bit field from a cache line in the shared cache and determining in dependence upon the contents of the core ID bit field whether the cache line was accessed by fewer than all the processor cores sharing the cache.

9. A system or shared cache eviction, the system including a multi-core processing environment having a cache shared by a plurality of processor cores, the system comprising:
    means for receiving from a processor core a request to load a cache line in the shared cache;
    means for determining whether the shared cache is full;
    means for determining whether a cache line is stored in the shared cache that has been accessed by fewer than all the processor cores sharing the cache if the shared cache is full; and
    means for evicting a cache line that has been accessed by fewer than all the processor cores sharing the cache if a cache line is stored in the shared cache that has been accessed by fewer than all the processor cores sharing the cache.

10. The system of claim 9 wherein means for evicting a cache line that has been accessed by fewer than all the processor cores sharing the cache further comprises means for evicting a cache line accessed by the fewest number of processor cores.

11. The system of claim 9 wherein means for evicting a cache line that has been accessed by fewer than all the processor cores sharing the cache further comprises:
    means for selecting a least recently used cache line that that has been accessed by fewer than all the processor cores; and
    means for evicting the selected cache line.

12. The system of claim 9 wherein means for evicting a cache line that has been accessed by fewer than all the processor cores sharing the cache further comprises:
    means for selecting a least frequency used cache line that that has been accessed by fewer than all the processor cores; and
    means for evicting the selected cache line.

13. The system of claim 9 wherein means for determining whether a cache line is stored in the shared cache that has been accessed by fewer than all the processor cores sharing the cache further comprises means for searching in a cache reference directory for cache lines identified as having been accessed by fewer than all the processor cores.

14. The system of claim 9 further comprising means for writing, to a core ID field in the cache reference directory in response to a processor core accessing a cache line in the shared cache, a core ID for the core processor accessing the cache line.

15. The system of claim 9 further comprising means for writing, to a core ID bit field in a cache line in response to a processor core accessing a cache line in the shared cache, a core ID for the core processor core accessing the cache line.

16. The system of claim 15 wherein means for determining whether a cache line is stored in the shared cache that has been accessed by fewer than all the processor cores sharing the cache further comprises means for reading a core ID bit field from a cache line in the shared cache and means for determining in dependence upon the contents of the core ID bit field whether the cache line was accessed by fewer than all the processor cores sharing the cache.

17. A multi-core processing system having a cache shared by a plurality of processor cores, the system comprising:
    control logic coupled to the plurality of processor cores and the shared cache; and
    a cache reference tracker coupled to the control logic capable of determining whether a cache line is stored in the shared cache that has been accessed by fewer than all the processor cores sharing the cache if the shared cache is full,
    wherein the control logic is further capable of evicting a cache line if the cache is full and if the cache line has been accessed by fewer than all the processor cores sharing the cache.

18. The multi-core processing system of claim 17 wherein the cache reference tracker is capable of writing, to a core ID field in a cache reference directory in response to a processor core accessing a cache line in the shared cache, a core ID for the core processor accessing the cache line.

19. The multi-core processing system of claim 17 wherein the cache reference tracker is capable of writing, to a core ID bit field in a cache line in response to a processor core accessing a cache line in the shared cache, a core ID for the core processor accessing the cache line.

* * * * *